Feb. 9, 1937.    S. J. NORDSTROM    2,070,490
VALVE
Filed May 17, 1928
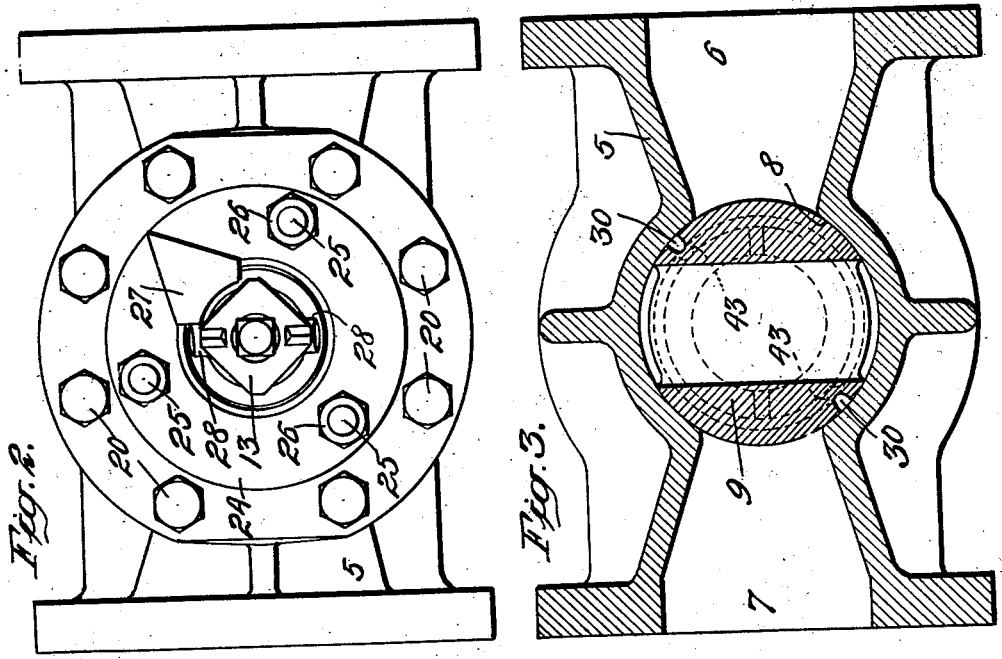
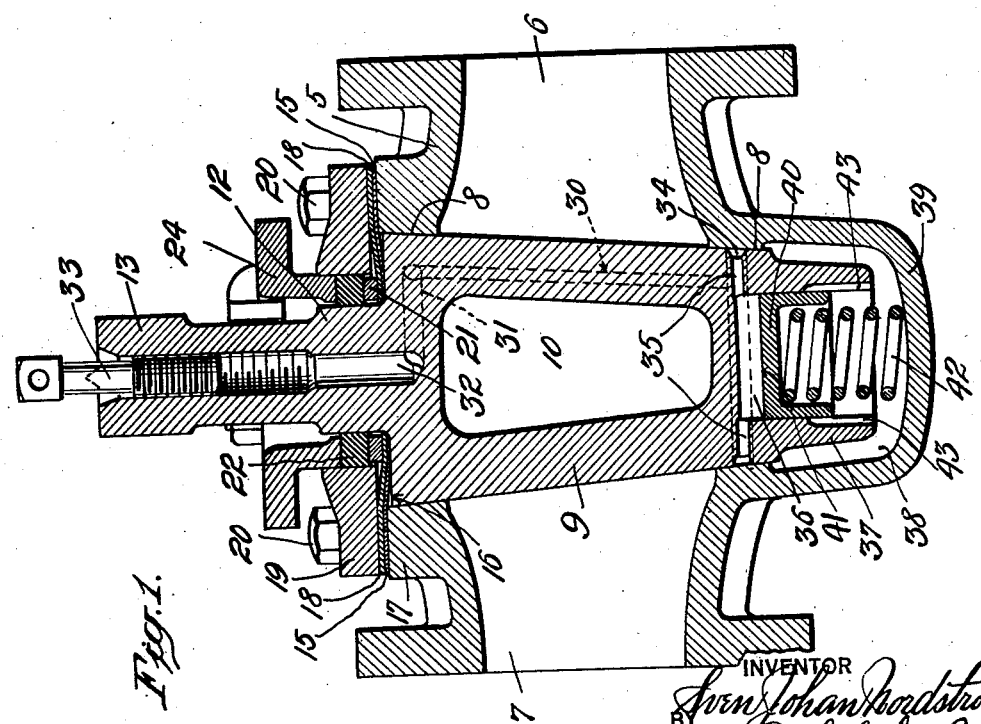
INVENTOR
Sven Johan Nordstrom
BY Archibald Cox
ATTORNEY Patented Feb. 9, 1937

2,070,490

UNITED STATES PATENT OFFICE 2,070,490

VALVE

Sven Johan Nordstrom, Oakland, Calif., assignor to Merco Nordstrom Valve Company, San Francisco, Calif., a corporation of Delaware Application May 17, 1928, Serial No. 278,422

19 Claims. (Cl. 251—93)

The invention relates to an improvement in valves, and more particularly to an improvement in plug valves of the type in which lubrication of the seating or bearing surfaces of the plug and the casing is effected by putting the lubricant under pressure to lift the plug from its seat in the casing.

One form of valve of this type comprises a casing provided with a chamber into which the smaller end of the plug projects. The chamber communicates by channels—either in the plug or in the casing or in both—with a reservoir for containing lubricant. Pressure is applied to the lubricant in the reservoir, forcing it into the channels and the chamber and thereby lifting the plug from its seat so that the separated seating or bearing surfaces of the plug and casing will be smeared with lubricant as the plug is turned. The reservoir, the channels and the chamber are termed the lubricating system of the valve.

One object of the present invention is to provide valves of the above described type with means for storing an auxiliary supply of lubricant and means for automatically forcing the stored lubricant into the channels to replace the lubricant dissipated during the operation of the valve. To this end one feature of the invention consists in providing the valve with means for forcing lubricant from an initial lubricant supply (as in the reservoir), through the channels, and into the space for containing the auxiliary supply of lubricant, and with means for forcing the auxiliary supply of lubricant back into the channels during the operation of the valve.

Another object of the invention is to effect the re-passage of the lubricant into the channels by means of a spring-pressed piston located in the chamber in the casing into which the smaller end of the plug projects, the parts being so arranged that the storing of the auxiliary supply of lubricant in the chamber causes the piston to compress the spring which then acts on the piston to return the auxiliary supply of lubricant into the channels.

A further object of the invention is to mount the spring-pressed piston in a cylinder formed in the part of the smaller end of the plug projecting into the chamber, and arranging the parts so that the free or lubricant side of the piston will communicate with the channels and the spring-engaged side of the piston will communicate with the contact joint between the plug and its seat in the casing. With this arrangement lubricant which has escaped from the lubricant side of the piston to the spring-engaged side thereof will be utilized to assist in lifting the plug from its seat and will pass into the space between the plug and the seat, thereby assisting in lubricating the seating surfaces of the valve. The improved valve having these novel features is more fully described hereinafter and is particularly pointed out in the appended claims.

In the accompanying drawing illustrating the preferred form of the invention, Fig. 1 is a longitudinal section through the improved plug valve; Fig. 2 is a top plan of the valve shown in Fig. 1; and Fig. 3 is a horizontal section taken on substantially the center line of the valve.

The improved valve as illustrated in the drawing comprises a casing 5 having a longitudinal passageway therethrough including an inlet 6 and an outlet 7. Formed in the casing 5 transversely of the passageway therethrough is a tapered seat 8 in which is mounted a tapered plug 9 provided with a hole 10 adapted to register with the passageway when the plug is in open position. As shown in Figs. 1 and 3 the plug 9 is in closed position shutting off the passageway through the valve. At its larger end the plug 9 is provided with an outwardly projecting stem 12 the outer extremity 13 of which is squared to receive a wrench by which the plug may be turned to open and close the valve.

The plug 9 is held in its seat 8 in the casing 5 by the following parts:—The inner edge of an anti-friction washer 15 bears against the upper surface 16 of the larger end of the plug at the point where it joins the stem 12. The outer edge of the anti-friction washer 15 rests on the annular flange 17 surrounding the larger end of the tapered seat in the casing. Superposed upon the anti-friction washer 15 is a flexible washer 18. The outer edges of the washers 15 and 18 are pressed firmly against the annular flange 17 by means of an annular cover plate 19 secured in place by the cap screws 20. A metal ring 21 is placed on the inner edge of the flexible washer 18, and superposed on the metal ring 21 is a flexible packing ring 22. The rings 21 and 22 are held in place by a gland 24 secured to the cover 19 by the bolts 25 and nuts 26. By adjusting the nuts 26 the pressure with which the plug 9 is held against its seat 8 may be regulated. A stop 27, formed on the gland 24, by engagement with shoulders 28 on the valve stem permits the plug to be turned through only a 90° arc and determines the open and closed positions of the plug.

The lubricating system of the improved valve comprises two longitudinally arranged grooves or channels 30 formed in the seating surface of the plug 9. At their upper ends the grooves 30 communicate by radial holes 31 (only one being indicated in the drawing) with the lower end of the lubricant reservoir 32 formed axially in the valve stem 12. The outer end of the reservoir 32 is threaded to receive a lubricant compression screw 33. The lower ends of the channels 30 open into a circumferential groove 34 formed in the smaller end of the plug. The circumferential groove 34 communicates by means of the radial holes 35 with the inner end of a cylinder 36 bored axially in the prolongation 37 of the smaller end of the plug extending into a chamber 38 formed in the outwardly extending part 39 of the valve casing 5. Mounted in the cylinder 36 is a cup-shaped piston 40 having a flat inner surface 41. Acting against the outer surface of the piston 40 is a coiled compression spring 42 the outer end of which bears against the adjacent part 39 of the casing. The expansive force of the spring 42 will be so adjusted that it will transmit to the lubricant in the lubricating system a pressure greater than that which will exist in the fluid passing through the valve, but will not be sufficient to prevent the plug from being held firmly in its seat by means of the flexible ring 22 and the flexible washer 18. The outer end of the cylinder 36 is provided with the grooves 43.

The improved valve operates in the following manner:—The compression screw 33 having been removed, the reservoir 32 is filled with lubricant, which is usually in stick or cartridge form. By replacing and turning inwardly on the screw 33 the lubricant is forced from the reservoir through the radial holes 31 and into the channels 30. Passing through the channels 30 the lubricant fills the circumferential groove 34 and then passes through the radial holes 35 into the inner end of the cylinder 36. Fresh insertion of lubricant in the reservoir 32 and continued inward turning on the screw 33 results in causing the lubricant passing into the cylinder 36 to act against the piston 40 and compress the spring 42. When the spring 42 has been compressed sufficiently to permit the inner face 41 of the piston to pass beyond the inner ends of the grooves 43 the lubricant passes into and fills the chamber 38. When the lubricating system of the valve has been thus filled with lubricant and further pressure is applied to the lubricant in the reservoir 32 by means of the screw 33 the force created within the cylinder 36 and within the chamber 38 lifts the plug from its seat so that when the plug is turned the lubricant oozing laterally from the longitudinal grooves 30 in the plug will be smeared over the adjacent seating surfaces of the plug and the casing, thereby thoroughly lubricating them. As the plug is lifted a part of the lubricant in the chamber 38 will be forced between the separated smaller end of the plug and the adjacent part of the seat in the casing, thereby lubricating these parts. During the lifting of the plug the lubricant will escape laterally from the circumferential groove 34 and assist in lubricating in the adjacent parts of the plug and the casing. As the plug is turned the pressure exerted by the flexible ring 22 and the flexible washer 18 will reseat the plug 9 against the casing.

The valve is now ready for its usual and continued operation, that is to say, the turning of the plug to open and close the valve. During the operation of the valve the lubricant on the seating surfaces of the plug and casing becomes dissipated, due partly to the conditions of service and partly to the turning of the plug. The dissipated lubricant is replaced by fresh lubricant from the lubricant supply in the cylinder 36, the spring 42 acting against the piston 40 forcing the lubricant out of the cylinder and back into the channels 30, whence it is distributed to the adjacent part of the seat in the casing as the plug is turned. Upon the exhaustion of the lubricant in the cylinder 36 the whole of the lubricating system is again charged with lubricant in the manner described above. As the spring 42 acts against the piston 40, compressing the lubricant in the cylinder 36, some of the lubricant escapes through the joint between the sides of the piston and the adjacent sides of the cylinder to the spring-engaged side of the piston. On the recharging of the lubricating system of the valve and the lifting of the plug from its seat, this lubricant which has escaped from the lubricant side 41 of the piston to the spring-engaged side thereof will eventually escape into the space between the separated smaller end of the plug and the adjacent part of the seat in the casing. Thus lubricant cannot accumulate in the chamber 38 to such an extent as to interfere with the proper functioning of the piston 40.

Certain subject matter disclosed in this application but not claimed, is claimed in my copending application Ser. No. 409,876, filed November 26, 1929, now Patent No. 1,944,995 granted Jan. 30, 1934.

Having thus described the invention what I claim as new is:—

1. A valve comprising, a casing having a passageway therethrough and a tapered seat formed transversely of the passageway, a tapered plug mounted in the seat and having a hole adapted to register with the passageway, the casing having a chamber into which the smaller end of the plug projects, a cylinder formed in the part of the plug projecting into the chamber, a piston mounted in the cylinder, longitudinal channels in the tapered surface of the plug communicating at one end with the cylinder, means for forcing lubricant under pressure through the channels and into the cylinder to act against one side of the piston, and a compression spring interposed between the other side of the piston and the adjacent side of the chamber.

2. A valve comprising, a casing having a passageway therethrough and a tapered seat formed transversely of the passageway, a tapered plug mounted in the seat and having a hole adapted to register with the passageway, a lubricant reservoir in the plug, the plug being provided with longitudinally extending channels in its tapered surface communicating with the reservoir, the casing being provided with a chamber into which the smaller end of the plug projects, the part of the plug projecting into the chamber being formed internally as a cylinder, a piston mounted to slide in the cylinder, said cylinder communicating at one end with the channels to receive lubricant therefrom, means for forcing lubricant from the reservoir, through the channels and into the cylinder, and a spring acting on the piston and arranged to be compressed when the cylinder is filled with lubricant to force the lubricant back into the channels during the operation of the valve.

3. A valve comprising, a casing having a passageway therethrough and a tapered seat formed transversely of the passageway, a tapered plug mounted in the seat and having a hole adapted to register with the passageway, the plug being provided in its tapered surface with longitudinal channels, a reservoir in the plug communicating with one end of the channels, a chamber in the casing into which the smaller end of the plug projects, the smaller end of the plug being provided with a cylinder opening at one end into the chamber and communicating at the other end with the channels, a piston mounted in the cylinder, a spring acting on the piston, and means for putting the lubricant in the reservoir under pressure to force it through the channels and into the cylinder to act against the piston and compress the spring so that the piston will force the lubricant out of the cylinder and into the channels during the operation of the valve.

4. A valve comprising, a casing having a passageway therethrough and a tapered seat formed transversely of the passageway, a tapered valve plug mounted in the seat and having a cylinder formed in the smaller end of the same, the casing having a chamber into which the smaller end of the plug projects, a movable member mounted in said cylinder, a spring acting against one side of the movable member, and means for forcing lubricant under pressure into the chamber to act against the other side of the movable member to compress the spring, the spring acting to force lubricant out of the chamber during the operation of the valve, the spring side of the movable member communicating with the contact joint between the plug and the seat in the casing to permit lubricant which has escaped to the spring side of the movable member to pass into the space between the plug and the casing when the plug has been lifted from its seat by the means for supplying lubricant under pressure to the chamber.

5. A valve comprising, a casing having a passageway therethrough and a tapered seat formed transversely of the passageway, a tapered plug mounted in the seat and having a hole adapted to register with the passageway, the casing having a chamber into which the smaller end of the plug projects, a cylinder formed in the part of the plug projecting into the chamber, a piston movably mounted in the cylinder, the tapered surface of the plug being provided with longitudinal channels in communication with one side of the piston, a spring acting on the other side of the piston, means for forcing lubricant under pressure through the channels to act on the other side of the piston to compress the spring and thereby lift the plug from its seat, the spring acting to return lubricant into the channels during the operation of the valve, and the spring side of the piston being in communication with the contact joint between the plug and its seat in the casing so that lubricant which has passed by the piston to the spring side thereof will escape into the space between the plug and its seat when the plug is separated from its seat.

6. A valve comprising, a casing having a passageway therethrough and a tapered seat formed transversely of the passageway, a tapered plug mounted in the seat and having a hole adapted to register with the passageway, the casing having a chamber into which the smaller end of the plug projects, a cylinder formed in the part of the plug projecting into the chamber, a piston mounted in the cylinder, a spring acting against one side of the piston, this side of the piston being in communication with the contact joint between the plug and its seat in the casing, means for forcing lubricant under pressure against the other side of the piston to compress the spring and lift the plug from its seat, the lifting of the plug from its seat permitting lubricant which has escaped from the free side of the piston to the spring side thereof to pass into the space between the plug and its seat.

7. A valve comprising, a casing having a passageway therethrough and a seat or bore formed transversely of the passageway, a plug rotatably positioned within the seat and having a hole adapted to register with the passageway, a cylinder, a piston slidably disposed in said cylinder, means for introducing lubricant under pressure in said cylinder adjacent one side of said piston, means for urging the piston in a direction to compress the stored lubricant, said stored lubricant being in communication with the valve working surfaces, and a lubricant chamber formed adjacent one end of said plug, whereby the plug can be moved longitudinally of its seat by introducing lubricant under pressure into said chamber, said plug having grooves for effecting communication between said one side of said piston and said chamber upon movement of said piston responsive to introduction of lubricant into said chamber.

8. A valve comprising, a casing having a passageway therethrough and a tapered seat formed transversely of the passageway, a tapered plug mounted in the seat and having a hole adapted to register with the passageway, means for yieldingly holding the plug against the seat, the casing having a chamber into which the smaller end of the plug projects, a cylinder formed in the smaller end of the plug and opening into the chamber, a piston mounted in the cylinder, a spring interposed between one side of the piston and the adjacent side of the casing, and means for introducing lubricant under pressure to act on the free side of the piston and compress the spring, the open end of the cylinder being provided with a series of longitudinal grooves, said grooves being of such length with respect to the length of the piston that when lubricant under pressure is introduced into the cylinder to compress the spring the piston uncovers the grooves and permits lubricant to enter the chamber whereby the plug may be lifted from its seat.

9. A valve comprising, a casing having a passageway therethrough and a seat or bore formed transversely of the passageway, a plug rotatably positioned within the seat and having a hole adapted to register with the passageway, a cylinder formed within one end of the plug and enclosed by the casing, a piston disposed within said cylinder and enclosed entirely within said casing, means for storing lubricant under pressure adjacent one side of the piston, and a spring for urging the piston in a direction to compress the stored lubricant, the valve having channels for supplying the stored lubricant to the valve working surfaces.

10. A valve comprising, a casing having a passageway therethrough and a seat formed transversely of the passageway, a plug mounted in the seat and having a hole adapted to register with the passageway, a cylinder formed within the plug and being in communication with the contact joint between the plug and the seat in the casing, a piston mounted to slide in the cylinder and wholly enclosed within the casing, a spring acting against one side of the piston and means for introducing lubricant under pressure into the cylinder to act on the free side of the piston and compress the spring, the spring acting to force the lubricant to the contact joint between the plug and the seat in the casing.

11. A valve comprising, a casing having a passageway therethrough and a seat or bore formed transversely of the passageway, a plug rotatably positioned within the seat and having a hole adapted to register with the passageway, a cylinder formed within one end of the plug and wholly enclosed by the casing, a piston disposed in said cylinder, means for storing lubricant under pressure adjacent one side of the piston, and spring means for urging the piston in a direction to compress the stored lubricant, the valve having channels for supplying the stored lubricant to the valve working surfaces.

12. A valve comprising a casing having a passageway therethrough and a bore or seat formed transversely of the passageway, a plug disposed in the bore and having a hole adapted to register with the passageway, the side of the casing at one end of the bore forming a chamber into which one end of the plug projects, the end of the plug projecting into the chamber being provided with a recess opening into the chamber, a movable member mounted in the recess, the valve having channels for supplying lubricant to the coacting valve surfaces of the plug and the seat, said channels being in communication with one side of the movable member, a spring acting against the other side of the movable member, and means for forcing lubricant under pressure through the channels to act on the movable member to compress the spring so that the movable member will force lubricant back into the channels during the operation of the valve.

13. A valve comprising a casing having a passageway therethrough and a tapered bore or seat formed transversely of the passageway, a tapered plug disposed in the bore and having a hole adapted to register with the passageway, the side of the casing at the small end of the bore forming a chamber into which the small end of the plug projects, the small end of the plug having a recess opening into the chamber, a movable member mounted in the recess, the valve having channels for supplying lubricant to the coacting valve surfaces of the plug and the bore, said channels being in communication with one side of the movable member, a spring acting against the other side of the movable member, and means for forcing lubricant under pressure through the channels to act on the movable member to compress the spring so that the movable member will force lubricant from the recess back into the channels during the operation of the valve.

14. A device of the class described, comprising a valve casing having a valve seat, a plug valve in said seat, a lubricant chamber in said valve, a lubricant passage formed by the seating surface of said valve and said seat and communicating with said chamber, a piston member in said chamber normally pressed by resilient means to force lubricant from said chamber in one direction, and an opening in said valve communicating with said passage through which lubricant under pressure is introduced to press said piston in the opposite direction against said resilient means and at all times store a supply of lubricant under pressure in said chamber and in said passage.

15. A device of the class described comprising a valve casing having a valve seat, a valve in said seat, a lubricant chamber in said valve at one end thereof, a lubricant passage formed by the seating surface of said valve and said seat and communicating with said chamber, a piston member in said chamber normally pressed by resilient means to force the lubricant from said chamber in one direction, and an opening in said valve at the other end thereof communicating with said passage for the introduction of lubricant under pressure to press said piston in the opposite direction against said means and store a supply of lubricant under pressure in said chamber and in said passage.

16. A device of the class described comprising a valve casing having a valve seat, a valve in said seat, a lubricant chamber in said valve, a lubricant passage formed by the seating surface of said valve and said seat and communicating with said chamber, a piston member in said chamber normally pressed by resilient means to force lubricant from said chamber in one direction, and an opening in said valve communicating with said passage for the introduction of lubricant under pressure to press said piston in the opposite direction against said means and store a supply of lubricant under pressure in said chamber and in said passage, and resilient means at all times acting on said valve to force it against its seat.

17. A device of the class described comprising a valve casing having a valve seat, a valve in said seat, a lubricant chamber in said valve, a lubricant passage formed by the seating surface of said valve and said seat and communicating with said chamber, a piston member in said chamber normally pressed by resilient means to force lubricant from said chamber in one direction, and an opening in said valve communicating with said passage for the introduction of lubricant under pressure to press said piston in the opposite direction against said means and store a supply of lubricant under pressure in said chamber and in said passage, and resilient means at all times acting on said valve to force it against its seat, said resiliently actuated piston at the same time acting to supply a film of lubricant in said passage between the valve and seat.

18. A valve comprising a body having inlet and outlet openings, a plug rotatably mounted within said body and having a passage extending therethrough for communicating said two openings when said plug is turned to one position, said plug closing off communication between said two openings when it is turned to a second position, a grease chamber in the bottom of said plug, ducts leading from said grease chamber and having outlets on the exterior surface of said plug, grooves in at least one of the contacting surfaces of said plug and body with which the outlets of said ducts are adapted to connect and mechanical means urging the grease from said chamber through said ducts.

19. A valve comprising a body having inlet and outlet openings, a plug rotatably mounted within said body and having a passage extending therethrough for communicating said two openings when said plug is turned to one position said plug closing off communication between said two openings when it is turned to a second position, a grease chamber in the bottom of said plug, a spring pressed plunger fitting within said grease chamber, and ducts leading from said grease chamber to the exterior surface of said plug, grooves in at least one of the contacting surfaces of said plug and body with which the outlets of said ducts are adapted to connect.

SVEN JOHAN NORDSTROM.